(12) United States Patent  
Narendran et al.

(10) Patent No.: US 9,357,448 B1
(45) Date of Patent: May 31, 2016

(54) METHOD AND SYSTEM FOR DYNAMICALLY UPDATING A HANDOVER-SCAN-LIST MAINTAINED BY A BASE STATION

(71) Applicant: Sprint Spectrum L.P., Overland Park, KS (US)

(72) Inventors: Rajveen Narendran, Olathe, KS (US); Siddhartha Chenumolu, Broadlands, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/527,185

(22) Filed: Oct. 29, 2014

(51) Int. Cl.
*H04W 36/00* (2009.01)
*H04W 36/04* (2009.01)
*H04W 84/04* (2009.01)

(52) U.S. Cl.
CPC ...... *H04W 36/0061* (2013.01); *H04W 36/0072* (2013.01); *H04W 36/04* (2013.01); *H04W 36/0055* (2013.01); *H04W 84/045* (2013.01)

(58) Field of Classification Search
CPC ............ H04W 88/04; H04W 36/0055; H04W 36/0083; H04W 88/02; H04W 48/20; H04W 36/08; H04W 28/18; H04W 16/18; H04W 36/0088; H04W 36/0094; H04W 36/06; H04W 74/0808; H04W 92/20; H04W 52/0245; H04W 52/265; H04W 52/267; H04W 72/02; H04W 72/0473; H04W 72/08; H04W 72/085; H04W 92/02; H04B 17/318
See application file for complete search history.

(56) References Cited

U.S. PATENT DOCUMENTS

2009/0129341 A1* 5/2009 Balasubramanian H04W 36/0055 370/331
2014/0045505 A1* 2/2014 Henry ............... H04W 36/0061 455/444

* cited by examiner

*Primary Examiner* — Nizar Sivji

(57) ABSTRACT

Disclosed herein is a method and corresponding system for dynamically updating a handover-scan-list maintained by a base station. In an example communication system comprising a first base station arranged to serve user equipment devices (UEs) on one or more carrier frequencies and a second base station arranged to maintain a handover-scan-list of carrier frequencies to which UEs served by the second base station can hand over, the first base station may process handover of a UE from being served by the first base station to being served by the second base station. During processing of the handover, the first base station may provide for receipt by the second base station a message indicating at least one carrier frequency on which the first base station is operating. In response to receiving the message, the second base station may then update the handover-scan-list to include the at least one carrier frequency.

12 Claims, 3 Drawing Sheets

METHOD AND SYSTEM FOR DYNAMICALLY UPDATING A HANDOVER-SCAN-LIST MAINTAINED BY A BASE STATION

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices (whether or not operated by a human user), can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to mobile terminals defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of mobile terminals, initiation of communications, handover between coverage areas, and other functions related to air interface communication.

In accordance with the air interface protocol, each of the one or more coverage areas of such a system may operate on one or more carrier frequencies and may define a number of air interface channels or specific resources for carrying signals and information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define a downlink control channel for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a wireless communication system (e.g., powers on in coverage of the system), the UE may detect a reference signal and read system information broadcast from a base station and may engage in a process to register itself to be served by the base station and generally by the system. For instance, the UE may transmit an attach message on an uplink control channel to the base station, and the base station and/or supporting infrastructure may then responsively authenticate and authorize the UE for service, establish a record indicating where in the system the UE is operating, establish local profile or context records for the UE, and provide an attach accept message to the UE. Thereafter, the UE may then be served by the system in an idle mode or a connected/active mode. In the idle mode, the UE may monitor a downlink control channel to detect page messages and other information regarding incoming communications and may similarly transmit uplink control signaling to initiate communications or for other reasons. In the connected/active mode, the UE may have particular traffic channel resources assigned by the RAN, which the UE may use to engage in communication of bearer traffic and the like.

When a UE is served by a base station, the UE may regularly monitor the reference signal from that base station and reference signals from other base stations in the vicinity, to help ensure that the UE continues to operate in a most appropriate coverage area. If the UE finds that one or more other base stations provide sufficiently strong coverage, perhaps sufficiently stronger than the UE's current serving base station (source base station), then the UE may engage in a handover process by which the UE transitions to be served by another particular base station (target base station). In the idle mode, the UE may do this autonomously and might re-register with another base station. Whereas, in the connected/active mode, the UE may transmit to its serving base station a measurement report that specifies the one or more detected coverage areas and, for each such coverage area, the detected signal strength. The serving base station and/or associated network infrastructure may then decide based on the UE's measurement report to process a handover of the UE to a particular target base station from which the UE detected sufficiently strong signal strength.

Generally, a wireless service provider may implement many "macro" base stations throughout its RAN, to provide UEs served by those base stations with widespread cellular coverage. Such macro base stations may include a tall antenna tower and may operate at a high transmission power for providing a larger range of coverage. In recent years, however, the cellular wireless industry has begun to expand beyond traditional macro base stations, by now deploying small cell base stations, or "small cells," such as a femtocells, picocells, or microcells, or other small scale base stations, typically having a much smaller form factor and operating at lower transmission power for providing a smaller range of coverage. A typical small cell may be about the size of a WiFi access point and may connect with a broadband wired/wireless connection to the Internet and establish a virtual private network (VPN) connection via the Internet with the wireless service provider's core network. The small cell may radiate to define a wireless coverage area in much the same way that a macro base station does. The small cell uses the broadband Internet connection to connect with the wireless service provider's network and to provide much of the same functionality as a macro base station. A small cell may provide service on a single carrier frequency (or on a single carrier frequency per technology, where multiple technologies are supported), and also transmit administrative messages and parameters that UEs can use to connect with the small cell.

Small cells serve the beneficial purpose of allowing subscribers to improve cellular coverage, perhaps in locations where the macro base station does not provide adequate coverage. As such, a wireless service provider may position small cells in areas that need added coverage, such as on lamp posts, utility poles, and the walls of tall buildings. Further, individuals and companies may acquire small cells from a wireless service provider and may position the small cells at desired locations, such as within a house or throughout a corporate campus.

OVERVIEW

In practice, a particular base station may maintain a "handover-scan-list" that indicates carrier frequencies to which UEs served by the particular base station can hand over, and may provide the handover-scan-list to the UEs in order to enable the UEs to engage in such a handover. For instance, the handover-scan-list may indicate carrier frequencies on which one or more other base stations located within coverage of the particular base station are operating, and the particular base station may provide the handover-scan-list to UEs served by the particular base station in order to enable the UEs to engage in an inter-frequency handover process. In such an inter-frequency process, a UE may scan for coverage on one or more carrier frequencies indicated by the handover-scan-list different than a carrier frequency on which the particular base station is currently serving the UE. As a result of the scanning, the UE may detect coverage on a given one of the indicated carrier frequencies that is sufficiently stronger (or otherwise more preferable) than the carrier frequency on which the particular base station is currently serving the UE and may report the stronger coverage to the particular base station so that the particular base station may then cause the UE to hand over to the detected carrier frequency.

An issue in such a system, however, is that cellular wireless networks may change from time to time, with base stations being added, removed, moved, or reconfigured to operate on different carrier frequencies than before. Consequently, it may be desirable for a base station to dynamically update the carrier frequencies indicated on the handover-scan-list in order to account for these changes to the network, such as when other base stations are added to the network and/or when the carrier frequencies on which other base stations operate change.

Disclosed herein is a method and corresponding system to facilitate dynamically updating a handover-scan-list maintained by a base station. In particular, the disclosed method and system provide for such updating to occur based on signaling between a first base station and a second base station during a handover process in which a UE served by the first base station (source base station) hands over to being served by the second base station (target base station), where the target base station is arranged to maintain the handover-scan-list. In accordance with the disclosure, during the time a UE hands over from the source base station to the target base station, the source base station may notify the target base station of one or more carrier frequencies on which the source base station is operating. The target base station may then update its handover-scan-list to include the one or more carrier frequencies.

The base stations at issue in the disclosed process may take various forms. By way of example, the first base station could be a small cell, and the second base station could be a macro base station. Furthermore, in line with the discussion above, the disclosed process may be useful in various scenarios. For example, when the first base station is a small cell that has been newly added to the network and is located within coverage of a macro base station, the macro base station may not be able to expressly determine the carrier frequency on which the small cell operates, and thus may not be able to update its handover-scan-list to include the new small cell's carrier frequency. Similarly, when the small cell's wireless service provider reconfigures the small cell to operate on a new carrier frequency different from the carrier frequency on which the small cell was operating before, the macro base station may not be able to expressly determine what the different carrier frequency is, and thus may not be able to update the handover-scan-list to include the different carrier frequency. In either scenario, by the disclosed process, the small cell can notify the macro base station of the carrier frequency on which the small cell operates, the macro base station can add the carrier frequency to the handover-scan-list, and the macro base station can then broadcast the handover-scan-list to UEs served by the macro base station to facilitate inter-frequency handover.

Accordingly, in one respect, disclosed is a method that includes a first base station serving a UE over an air interface. Further, the method includes the first base station processing handover of the UE from being served by the first base station to being served by a second base station. Still further, the method includes, while processing the handover, the first base station providing for receipt by the second base station a message indicating at least one carrier frequency on which the first base station is operating.

In another respect, disclosed is a method that includes, while a UE is engaged in a handover process in which the UE hands over from being served by a first base station to being served by a second base station, the second base station receiving an indication, provided by the first base station, of at least one carrier frequency on which the first base station is operating. Further, the method includes, responsive to the received indication being that the first base station is operating on the at least one carrier frequency, the second base station adding the at least one carrier frequency to a handover-scan-list of frequencies maintained by the second base station In yet another respect, disclosed is a system that includes a first base station arranged to serve UEs over an air interface on one or more carrier frequencies and a second base station arranged to maintain a handover-scan-list of carrier frequencies to which UEs served by the second base station can hand over. Further, the system includes two or more processors, where the two or more processors include at least one processor of the first base station and at least one processor of the second base station. Still further, the system includes data storage, and program instructions stored in the data storage and executable by the two or more processors to cause the system to perform operations. The operations may include processing handover of a UE from being served by the first base station to being served by the second base station. Further, the operations may include, while processing the handover, the first base station providing for receipt by the second base station a handover-based frequency report indicating at least one carrier frequency on which the first base station is operating. Still further, the operations may include, responsive to receiving the handover-based frequency report, the second base station adding the at least one carrier frequency to the handover-scan-list.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The present method and system will now be described with reference to the figures. It should be understood, however, that numerous variations from the depicted arrangements and operations are possible while remaining within the scope and spirit of the claims. For instance, one or more elements may be added, removed, combined, distributed, substituted, re-positioned, re-ordered, and/or otherwise changed. Further, where this description refers to one or more operations being implemented on and/or by one or more devices, one or more machines, and/or one or more networks, it should be understood that one or more of such entities could carry out one or more of such operations by themselves or in cooperation, and may do so by application of any suitable combination of hardware, firmware, and/or software. For instance, one or more processors may execute one or more sets of programming instructions as at least part of carrying out of one or more of the operations described herein.

Figure 1:
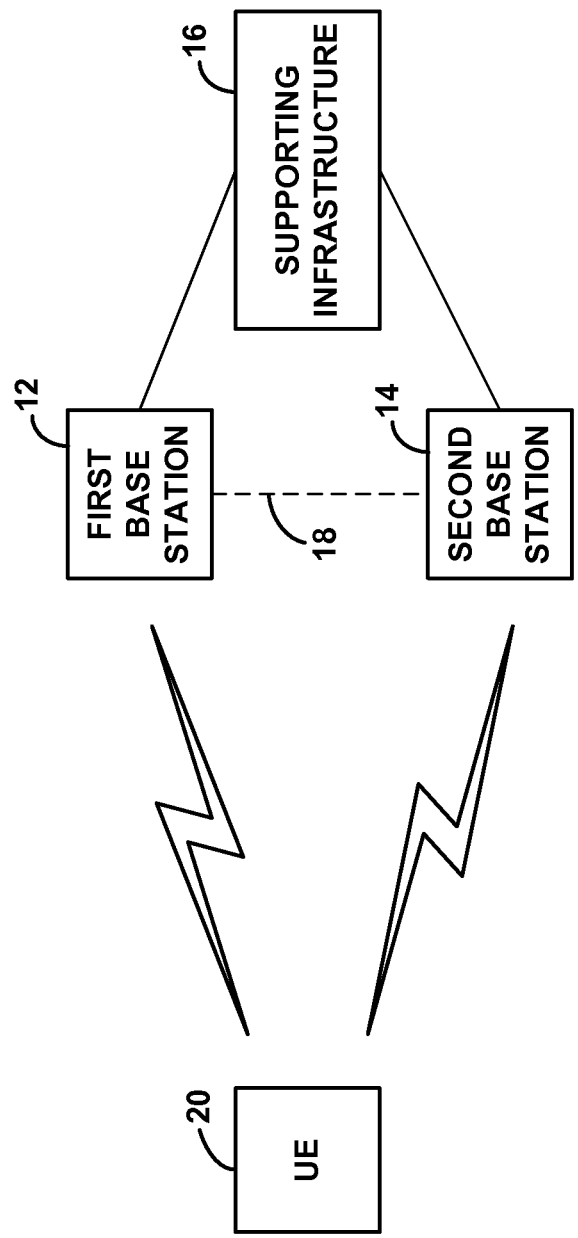
FIG. 1 is a simplified block diagram of an example communication system in which aspects of the present disclosure can be implemented.

Referring to the drawings, as noted above, FIG. 1 is a simplified block diagram of an example network arrangement in which the features of the present disclosure can be implemented. In particular, the figure depicts a first base station 12 and a second base station 14. In practice, these two base stations may take any of a variety of forms. By way of example, as discussed above, one base station (e.g., the first base station) could be a small cell, and the other base station (e.g., the second base station) could be a macro base station. Alternatively, both base stations could be macro base stations or small cells. Regardless, each base station would include a transceiver and an antenna structure that radiates to define at least one wireless coverage area in which to serve UEs.

As shown, the example network arrangement further includes supporting network infrastructure 16 that helps enable the first base station 12 and the second base stations 14 to serve UEs. By way of example, in an LTE network, the supporting infrastructure may include a mobility management entity (MME) that functions as a controller for the LTE network and that has an interface for communication with each of the base stations. As another example, in a CDMA network, the supporting infrastructure may include a mobile switching center (MSC) that functions as a controller of the CDMA network and that has an interface for communication with each of the base stations, typically through a base station controller (BSC) or radio network controller (RNC). In either of these arrangements, the supporting infrastructure (e.g., an MME, MSC, BSC, etc.) can manage registration of UEs with the network and paging of UEs served by each of the two base stations.

Furthermore, the supporting infrastructure 16 can facilitate communication between the two base stations 12, 14. For instance, in an LTE network, the first base station may transmit a message for receipt by the second base station by transmitting the message to an MME, and the MME may then transmit the message to the second base station. Likewise, in a CDMA network, the first base station may transmit a message for receipt by the second base station by transmitting the message to a BSC, and the BSC may then transmit the message to the second base station. It should be understood, however, that the example network arrangement may also include a communication path 18 (e.g., an X2 interface or other wired and/or wireless interface) through which the two base stations can communicate more directly with each other. It should also be understood that the network arrangement, including the base stations and supporting infrastructure, could take other forms as well, using air interface protocols other than LTE or CDMA.

Shown positioned within coverage of each of the two base stations 12, 14 is a representative UE 20 (e.g., a cell phone, a wirelessly-equipped computer, a tracking device, an embedded wireless communication module, or any other type of wireless communication device). With this arrangement, we may assume that UE 20 is attached with the first base station and is thus being served by the first base station in an idle mode or a connected mode. Further, we may assume that, as the UE is served by the first base station, the UE regularly monitors a downlink reference signal from the first base station and from each other base station of the network that the UE can detect, such as the second base station.

In line with the discussion above, when the UE 20 detects sufficiently strong coverage from the second base station 14, such as coverage sufficiently stronger than that of the first base station 12, the UE may attempt to initiate a handover process in which the UE hands over from the first base station (source base station) to the second base station (target base station). For instance, the UE may transmit a measurement report to the first base station to trigger possible handover. The first base station and/or associated supporting infrastructure 16 may then decide based on the UE's measurement report to process a handover of the UE to the second base station. If the first base station determines that the reported signal strength of the second base station is sufficient, then the first base station may transmit a handover request message either directly (e.g., via communication path 18) or indirectly (e.g., via the supporting infrastructure 16) to the second base station to prepare the second base station to receive handover of the UE (e.g., reserving resources to facilitate serving the UE). Upon preparing for handover of the UE, the second base station may then transmit to the first base station a handover request acknowledge message that carries information for use by the UE to engage in communication with the second base station. The first base station may then transmit to the UE a handover directive to cause the UE to hand over to the second base station.

It should be understood that in other arrangements, the UE may be served by the second base station and may hand over to be served by the first base station. In such scenarios, the second base station may act as the source base station, the first base station may act as the target base station, and the handover process may be carried out in a manner similar to or different from the process described above.

In some scenarios, one or both of the first and second base stations 12, 14 may serve respective UEs and may need to provide these UEs with the means to hand over from being served on one carrier frequency to be served on another, different carrier frequency (i.e., inter-frequency handover), such as when coverage on a UE's current serving carrier frequency is threshold poor. To facilitate this in practice, as noted above, each base station may maintain a handover-scan-list of carrier frequencies and broadcast the handover-scan-list to UEs in order to enable the UEs to engage in such a handover. For instance, a base station serving a UE may maintain and broadcast to the UE a handover-scan-list that specifies carrier frequencies available within the serving base station's coverage area and/or other available carrier frequencies, such as carrier frequencies available within coverage areas adjacent to the serving base station's coverage area. The UE may then scan for coverage on specified carrier frequencies that are different than the carrier frequency on which the base station is currently serving the UE. As a result of the scanning, the UE may detect coverage on a given one of the specified carrier frequencies that is sufficiently stronger (or otherwise more preferable) than the coverage on the UE's current carrier frequency and may report the stronger coverage to the serving base station so that the serving base station may then cause the UE to hand over to the detected carrier frequency.

In an example of inter-frequency handover, a UE may report to the serving base station threshold poor coverage on the UE's current serving carrier frequency, and the serving base station may responsively transmit to the UE an inter-frequency search directive that includes the handover-scan-list (e.g., a carrier frequency search request message (CFS-RQM), in a CDMA network). The UE may then respond to the inter-frequency search directive by scanning for coverage on the carrier frequencies specified by the handover-scan-list, thereby facilitating handover to a carrier frequency on which the UE detects sufficiently stronger coverage than on its current serving carrier frequency. In another example of inter-frequency handover, however, the serving base station may generally broadcast to UEs a message including the handover-scan-list without the UEs first having to report threshold poor coverage. For instance, in an LTE network, a base station may periodically broadcast in its coverage area a System Information Block #5 (SIB5) message that includes the handover-scan-list. In a CDMA network (e.g., 1×RTT or 1×EV-DO), on the other hand, a base station may periodically broadcast in its coverage area a system parameter message or a Channel List Message (CLM) that includes the handover-scan-list.

As noted above, at issue in inter-frequency handover scenarios is that a wireless service provider may, from time to time, make changes to base stations present within coverage of a serving base station. For instance, the wireless service provider may add new base stations, where each added base station is arranged to operate on one or more carrier frequencies. Additionally or alternatively, the wireless service provider may reconfigure existing base stations to operate on one or more carrier frequencies that are different from the one or more carrier frequencies on which the existing base stations were operating before. Thus, it may be desirable for a serving base station to update its handover-scan-list to account for these or other changes, namely, to include in its handover-scan-list carrier frequencies of the added and/or reconfigured base stations.

As noted above, the present method provides for dynamically updating a handover-scan-list maintained by a base station to account for these changes. In particular, the present method provides for this process to occur when the base station at issue is a target base station taking part in handover of a UE from a source base station to the target base station. By way of this process, a first base station (source base station) (e.g., a newly-added base station and/or a reconfigured existing base station, as discussed above) can use signaling during the handover to inform the second base station (target base station) of the one or more carrier frequencies on which the second base station is operating.

In an example implementation of this process, the first base station (source base station) and the second base station (target base station) may process handover of a UE from being served by the first base station to being served by the second base station, as described above. During the handover processing, the first base station may transmit for receipt by the second base station a message specifying one or more carrier frequencies on which the first base station is operating. The second base station may then receive the message and responsively update its handover-scan-list by adding the specified one or more carrier frequencies to the handover-scan-list or by otherwise ensuring that the handover-scan-list includes the specified one or more carrier frequencies.

In line with the discussion above, the handover process (i.e., a processing of the handover) may have different possible starting points and ending points. By way of example, the handover process may begin when the UE engages in signaling with the UE's serving base station (the first base station) and/or with other network infrastructure in order to trigger possible handover. For instance, the handover process may begin when the UE transmits to the first base station a message indicating threshold poor coverage on the UE's serving carrier frequency and/or indicating detected signal strengths on other carrier frequencies, such as a measurement report. As another example, the handover process may begin when the first base station determines that a signal strength indicated by the measurement report is sufficient for handover. As yet another example, the handover process may begin when the first base station transmits a handover request message to the second base station. Other examples of starting points of the handover process are possible as well, including but not limited to other events and signaling described herein.

Likewise, various ending points of the handover process are possible. By way of example, the handover process may end when the second base station transmits to the first base station a handover request acknowledgement message. As another example, the handover process may end when the first base station transmits to the UE a handover directive to cause the UE to hand over to the second base station. As yet another example, the handover process may end when the UE has finished handing over to be served by the second base station and is no longer being served by the first base station. Other examples of ending points of the handover process are possible as well, including but not limited to other events and signaling described herein.

As noted above, during the processing of the handover, the first base station may transmit for receipt by the second base station a signaling message that specifies the one or more carrier frequencies on which the first base station is operating. Such a signaling message may be considered to be (and may be referred to as) a "handover-based frequency report." In an example implementation of the disclosed process, the first base station may transmit the handover-based frequency report together with (i.e., along with, but separate from) a handover request message or together with another signaling message that the first base station transmits as part of the handover process. In another implementation, the first base station may include the handover-based frequency report in a particular message, such as a handover request message or another signaling message, and then transmit that message. In yet another implementation, the first base station may transmit the handover-based frequency report as a distinct message, transmitted separate from and/or at a different time than any other handover signaling message described above. Moreover, during the handover process, the first base station may transmit for receipt by the second base station another type of signaling message that specifies the one or more carrier frequencies on which the first base station is operating, including any type of signaling message described herein or not described herein.

Furthermore, in line with the discussion above, the first base station can transmit the handover-based frequency report to the second base station directly, such as via a direct communication path between the first and second base stations (e.g., communication path 18). Alternatively, the first base station can transmit the handover-based frequency report to the second base station indirectly through at least one other network entity. For example, in an LTE network, the first base station may transmit the handover-based frequency report to an MME, which may in turn transmit the handover-based frequency report to the second base station. In a CDMA network, on the other hand, the first base station may transmit the handover-based frequency report to a BSC, which may in turn transmit the handover-based frequency report to the second base station. Further, in a CDMA network, the first base station may transmit the handover-based frequency report to an MSC, which may in turn transmit the handover-based frequency report to the second base station via a BSC.

As noted above, the second base station may receive the handover-based frequency report from the first base station and responsively update the second base station's handover-scan-list to include the specified one or more carrier frequencies by adding the specified one or more carrier frequencies to the handover-scan-list. The second base station may receive the handover-based frequency report during the handover process for instance, or may receive the handover-based frequency report at a point in time after the handover process has ended. Further, in some implementations, the second base station may ensure that the handover-scan-list includes the specified one or more carrier frequencies in ways other than by adding the specified one or more carrier frequencies to the handover-scan-list, such as by checking the handover-scan-list and determining that the handover-scan-list already includes the specified one or more carrier frequencies. The second base station may ensure that the handover-scan-list includes the specified one or more carrier frequencies in other manners as well.

Moreover, at some point after the second base station has updated its handover-scan-list, the second base station can then transmit the handover-scan-list, including the one or more carrier frequencies on which the first base station is operating, to at least one UE served by the second base station in order to facilitate inter-frequency handover. As an example, the second base station could transmit a message including the handover-scan-list to one or more specific UEs served by the second base station. For instance, in an LTE network, a CDMA network, or in other types of networks, the second base station could transmit to a UE an inter-frequency search directive including the handover-scan-list, in response to the UE reporting to the second base station threshold poor coverage on the UE's current serving carrier frequency. As another example, the second base station could broadcast a message including the handover-scan-list to at least one UE served by the second base station. For instance, in an LTE network, the second base station may broadcast a SIB5 message including the handover-scan-list. In a CDMA network, on the other hand, the second base station may broadcast a system parameter message, or CLM, including the handover-scan-list.

Figure 2:
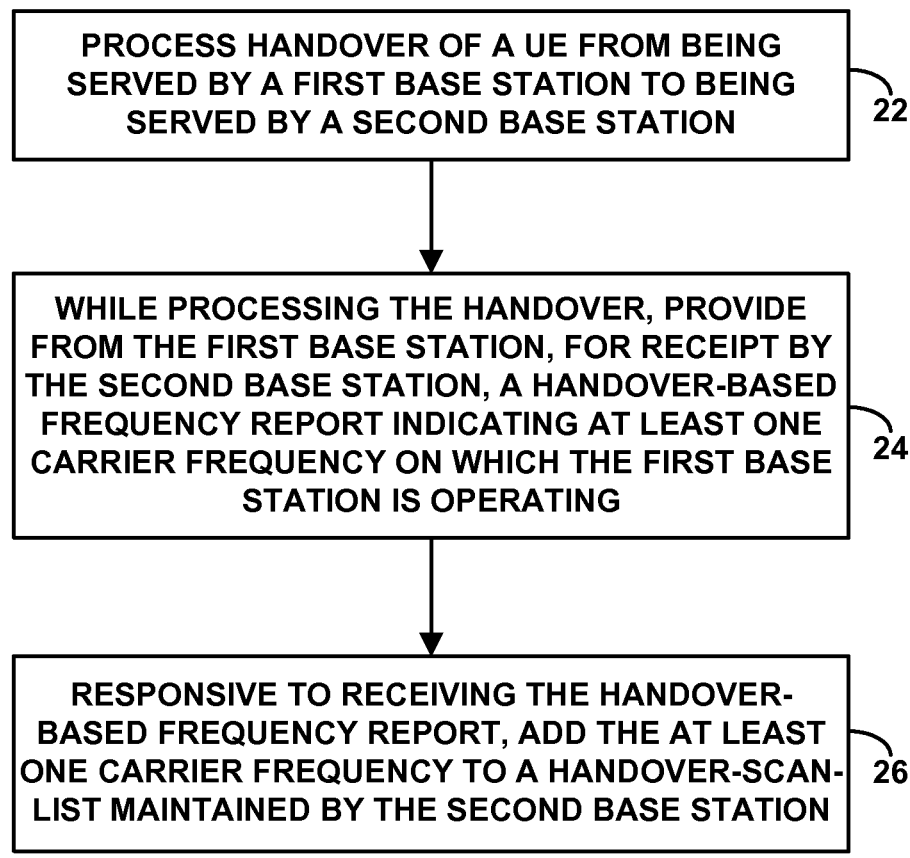
FIG. 2 is a flow chart depicting operations that can be carried out in accordance with the present method.

FIG. 2 is a flow chart depicting operations that can be carried out in accordance with this description. Namely, the operations may be carried out by system comprising a first base station (e.g., a source base station) arranged to serve UEs over an air interface on one or more carrier frequencies and further comprising a second base station (e.g., a target base station) arranged to maintain a handover-scan-list of carrier frequencies to which UEs served by the second base station can hand over. As shown in FIG. 2, at block 22, the system processes handover of a UE from being served by the first base station to being served by the second base station. At block 24, while processing the handover, the first base station provides for receipt by the second base station a handover-based frequency report indicating at least one carrier frequency on which the first base station is operating. At block 26, responsive to receiving the handover-based frequency report, the second base station adds the at least one carrier frequency to the handover-scan-list.

As discussed above, the first base station may provide the handover-based frequency report, for receipt by the second base station, together with, or included as part of, a handover request message or other type of signaling message transmitted from the first base station to the second base station during handover of the UE. The first base station could also provide the handover-based frequency report, for receipt by the base station, as a distinct message, provided separately from and/or at a different time than other handover signaling messages.

Furthermore, the second base station may receive the handover-based-frequency report directly or indirectly from the first base station. The second base station may then add the at least one carrier frequency to the handover-scan-list (or otherwise ensure that the handover-scan-list includes the at least one carrier frequency) in response to (i) the second base station receiving the handover-based frequency report during the processing of the handover of the UE and (ii) the handover-based frequency report including the at least one carrier frequency. Moreover, the second base station may then broadcast a message including the handover-scan-list to at least one UE served by the second base station to facilitate scanning by the at least one UE for inter-frequency handover. Additionally or alternatively, the second base station may transmit a message including the handover-scan-list to at least one specific UE served by the second base station to facilitate scanning by the at least one UE for inter-frequency handover.

Figure 3:
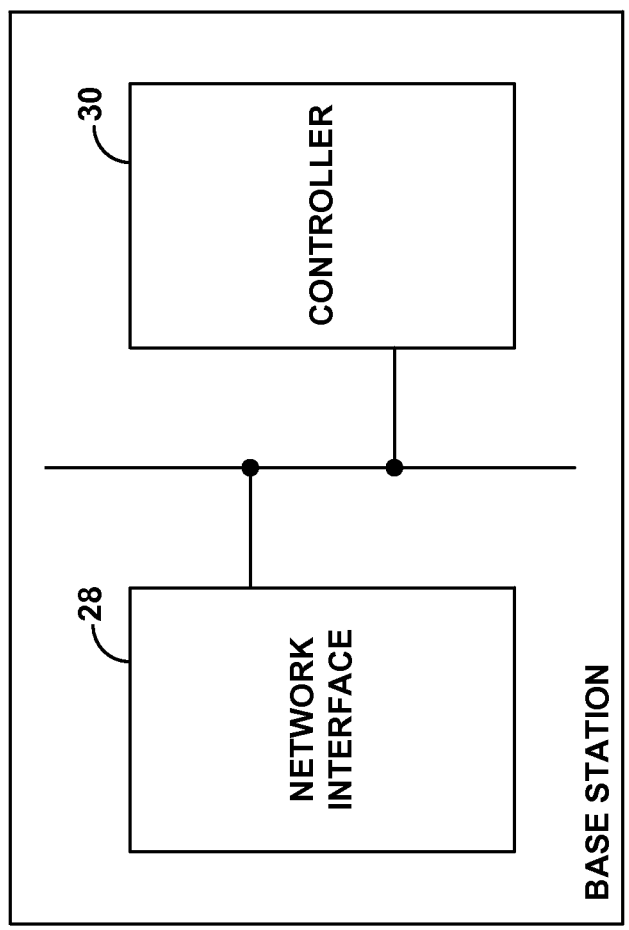
FIG. 3 is a simplified block diagram of an example base station arranged to implement aspects of the present method.

FIG. 3 is a simplified block diagram of an example base station, such as the first base station 12 and/or second base station 14 discussed above, showing some of the components of such a base station that could be provided to facilitate implementation of operations such as those described above. This base station could take various forms, such as a macro base station of the type that typically includes an antenna tower and provides a broad range of coverage, or a small cell (e.g., a femtocell, picocell, or a microcell), which typically has a much smaller form factor and provides a smaller range of coverage. As shown, the example base station includes an antenna structure 28 that radiates to define an air interface coverage area for serving UEs, where the coverage area operates on one or more carrier frequencies. Further, the example base station includes a controller 30 that manages wireless communication via the antenna structure.

In practice, for instance, the controller 30 may include at least one processing unit, data storage, and program instructions stored in the data storage and executable by the at least one processing unit to carry out various operations described herein. By the disclosed method, when the base station is a source base station, these operations may include, among others discussed above, (i) processing handover of a UE from being served by the source base station to being served by a target base station and (ii) while processing the handover, providing for receipt by the target base station a message indicating at least one carrier frequency on which the source base station is operating. As a target base station, on the other hand, the operations may include, among others discussed above, (i) while a UE is engaged in a handover process in which the UE hands over from being served by a source base station to being served by the target base station, receiving an indication, provided by the source base station, of at least one carrier frequency on which the source base station is operating and (ii) responsive to the received indication being that the source base station is operating on the at least one carrier frequency, the target base station adding the at least one carrier frequency to a handover-scan-list of frequencies maintained by the target base station (e.g., maintained in data storage).

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
while a user equipment device (UE) is engaged in a handover process in which the UE hands over from being served by a first base station to being served by a second base station, the second base station receiving an indication, provided by the first base station, of at least one carrier frequency on which the first base station is operating;
responsive to the received indication being that the first base station is operating on the at least one carrier frequency, the second base station adding the at least one carrier frequency to a handover-scan-list of carrier frequencies maintained by the second base station, the handover-scan-list being a scan-list that the second base station provides, to at least one UE served by the second base station, to cause the at least one UE to scan in accordance with the handover-scan-list, thereby facilitating engagement by the at least one UE in inter-frequency handover; and
the second base station providing the handover-scan-list, including the added at least one carrier frequency, to the at least one UE to cause the at least one UE to scan in accordance with the provided handover-scan-list, thereby facilitating engagement by the at least one UE in inter-frequency handover.

2. The method of claim 1, wherein the second base station serves the at least one UE over a Long Term Evolution (LTE) air interface, and wherein providing the handover-scan-list to the at least one UE comprises broadcasting, to the at least one UE, a System Information Block #5 (SIB5) message that includes the handover-scan-list.

3. The method of claim 1, wherein receiving the indication comprises receiving the indication, provided by the first base station, together with a handover request message.

4. The method of claim 1, wherein receiving the indication comprises receiving the indication, provided by the first base station, directly from the first base station.

5. The method of claim 1, wherein receiving the indication comprises receiving the indication from a network entity that received the indication provided by the first base station.

6. The method of claim 1, wherein adding the at least one carrier frequency to the handover-scan-list is further responsive to the second base station receiving the indication during the handover process.

7. A system comprising:
a first base station arranged to serve user equipment devices (UEs) over an air interface on one or more carrier frequencies;
a second base station arranged to maintain a handover-scan-list of carrier frequencies, the handover-scan-list being a scan-list that the second base station provides, to at least one UE served by the second base station, to cause the at least one UE to scan in accordance with the handover-scan-list, thereby facilitating engagement by the at least one UE in inter-frequency handover;
two or more processors, wherein the two or more processors include at least one processor of the first base station and at least one processor of the second base station;
data storage; and
program instructions stored in the data storage and executable by the two or more processors to cause the system to perform operations comprising:
processing handover of a UE from being served by the first base station to being served by the second base station,
while processing the handover, the first base station providing for receipt by the second base station, a handover-based frequency report indicating at least one carrier frequency on which the first base station is operating,
responsive to receiving the handover-based frequency report, the second base station adding the at least one carrier frequency to the handover-scan-list, and
the second base station providing the handover-scan-list, including the added at least one carrier frequency, to the at least one UE to cause the at least one UE to scan in accordance with the provided handover-scan-list, thereby facilitating engagement by the at least one UE in inter-frequency handover.

8. The system of claim 7, wherein the second base station is a macro cell, and wherein first base station is a small cell selected from the group consisting of: a femtocell, a picocell, and a microcell.

9. The system of claim 7,
wherein providing the handover-scan-list, including the added at least one carrier frequency, to the at least one UE comprises broadcasting to the at least one UE a message including the handover-scan-list, the handover-scan-list including the added at least one carrier frequency.

10. The system of claim 9, wherein the second base station serves the at least one UE over a Long Term Evolution (LTE) air interface, and wherein the message is a System Information Block #5 (SIB5) message.

11. The system of claim 7, wherein the first base station is arranged to serve UEs over a Code Division Multiple Access (CDMA) air interface, wherein providing the handover-based frequency report for receipt by the second base station comprises providing the handover-based frequency report, to a base station controller (BSC), for transmission from the BSC to the second base station.

12. The system of claim 7, wherein the first base station is arranged to serve UEs over a Long Term Evolution (LTE) air interface, wherein providing the handover-based frequency report for receipt by the second base station comprises providing the handover-based frequency report, to a mobility management entity (MME), for transmission from the MME to the second base station.

* * * * *